Nov. 30, 1943.   S. MAYNER   2,335,351
CLUTCH AND ACCELERATOR INTERLOCK
Filed Jan. 31, 1942

INVENTOR
STANLEY MAYNER
BY
Hyde and Meyer
ATTORNEYS

Patented Nov. 30, 1943

2,335,351

UNITED STATES PATENT OFFICE 2,335,351

CLUTCH AND ACCELERATOR INTERLOCK

Stanley Mayner, Cleveland, Ohio, assignor to The Euclid Road Machinery Co., Euclid, Ohio, a corporation of Ohio Application January 31, 1942, Serial No. 429,013

1 Claim. (Cl. 192—.01)

This invention relates to an improved interlock compelling a predetermined correlation between the operation of the clutch and accelerator actuators of a motor driven vehicle.

Some of the greatest advantages of my invention are realized when my improved interlock is used in conjunction with a vehicle having a fluid drive. One of the objects of fluid drive is to provide a gradual application of the power of the engine to driving the vehicle or to performing some other work. Where an internal combustion motor is used to perform heavy duty, there is a great tendency on the part of the operator to speed up the motor and to throw in the clutch controlling the fluid drive suddenly so that the motor will take hold of the load and perform the desired work. This of course places a heavy strain on the working parts and nullifies the desired effect of the fluid drive. An object of the present invention is to prevent such unintended use of a fluid drive.

More specifically stated, one of the objects of the present invention is to prevent motor accelerating movement of an accelerator actuator when a clutch actuator is moved to declutching position.

Other objects and advantages of the invention will be apparent from the accompanying drawing and description and the essential features will be set forth in the claim.

Figure 1:
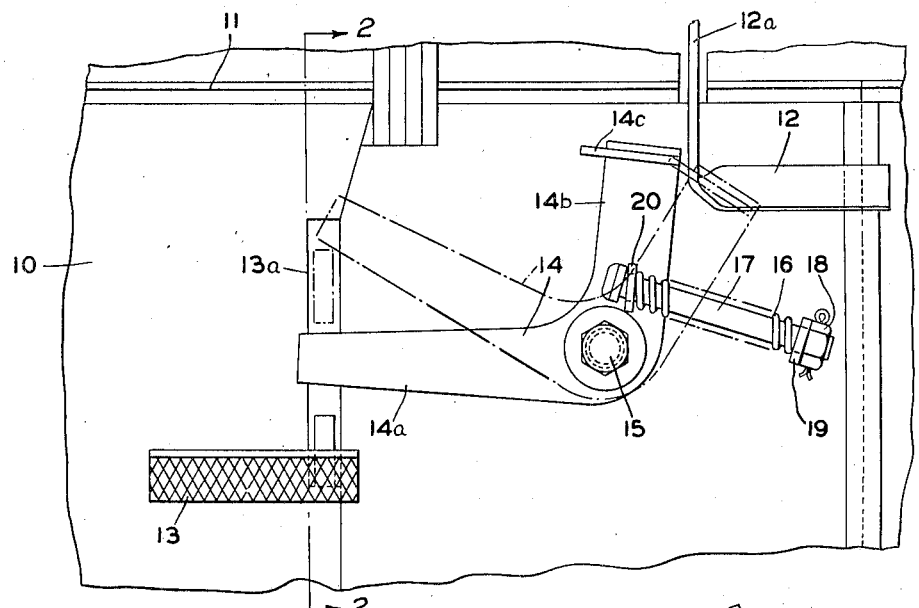
Figure 2:
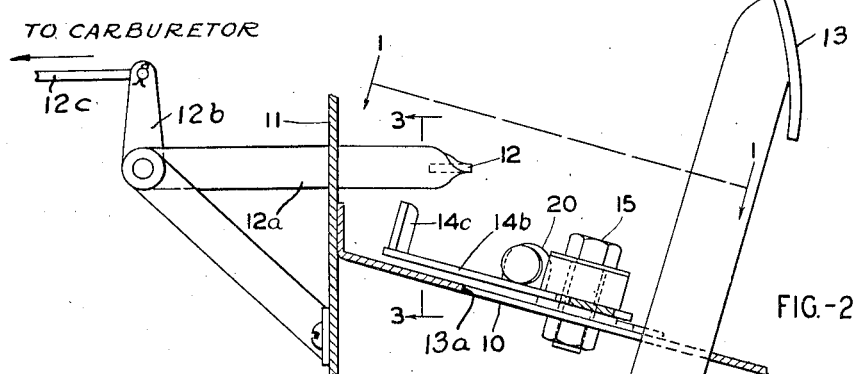
Figure 3:
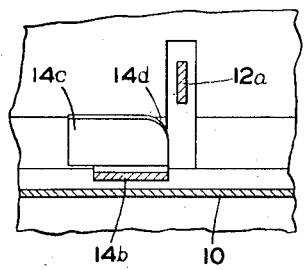

In the drawing, Fig. 1 is a plan view of a portion of the floor of the control cab of a motor driven vehicle showing the relative position of the operating parts of my improved interlocking device, this view being taken from approximately the position of the line 1—1 of Fig. 2; Fig. 2 is a sectional view taken on the line 2—2 of Fig. 1; while Fig. 3 is a fragmental sectional view taken on the line 3—3 of Fig. 2.

My invention is shown as applied to operating parts for an automotive vehicle, the general arrangement of which is familiar to all of those skilled in this art and therefore only sufficient parts are shown and described to enable one to understand the present improvement.

In Figs. 1 and 2, I have illustrated a floor board 10 in the control cab of a motor vehicle wherein the dash 11 separates the driver from the engine compartment which, in the present instance, is intended to house an internal combustion engine, the speed of which is controlled by the accelerator 12. This is the usual foot accelerator for controlling the rate of flow of gasoline or other fuel through the carburetor of the engine to the motor and therefore it controls the speed of the motor.

The pedal 13 is the usual clutch control pedal found in motor vehicles driven by internal combustion engines. When the pedal is in the full line position of Fig. 1, the clutch is engaged so that the engine is connected to the drive wheels of the vehicle as will be readily understood. When the clutch pedal is moved forwardly (upwardly in Fig. 1 in the slot 13a and toward the left in Fig. 2) the clutch is disconnected.

As mentioned above, this invention has many advantages in that type of vehicle wherein the vehicle drive includes a fluid coupling. Such drives are well known and detailed explanation is unnecessary here. It is sufficient to say, however, that such a drive includes a fluid-tight housing filled with oil or the like wherein there are two impellers in axial alinement, one of the impellers being driven from the engine and the other being driven through the medium of the fluid in the housing. My improved interlocking device has been very successful in a vehicle wherein the motor drives a shaft operating the driving impeller of the fluid coupling and wherein the driven impeller of the coupling is connected to a disk clutch. The driven side of the clutch is in turn connected through the transmission to the driving wheels.

For the purposes of my invention I have utilized a bellcrank 14 having a fixed pivotal mounting at 15 and having one arm 14a lying in the path of movement of the clutch pedal 13. The other arm 14b of the bellcrank moves in a zone close to the path of movement of the accelerator pedal 12. More particularly it may move into the path of movement of the bar 12a which carries the pedal 12. It will be understood from the drawing that this bar moves in a vertical plane. The arm 14b carries an abutment 14c extending in a generally vertical direction. The end of this abutment toward the right in Figs. 1 and 3 may be bevelled or curved to prevent interference with the bar 12a. The bellcrank is biased in a counterclockwise direction as viewed in Fig. 1 by means of spring 16 which is held on a pin or bolt 17 by means of a nut 18. One end of the bolt passes through an eye 19 having a swiveled mounting and the other end of the bolt passes through a collar 20 on the arm 14b. The spring 16 thus acts in compression to normally urge the bellcrank to the full line position of Fig. 1. When the clutch pedal moves upwardly in Fig. 1, it engages the arm 14a and moves the bellcrank in a clockwise direction to the dot-dash position where the abutment 14c lies beneath the accelerator pedal bar 12a and prevents any substantial downward movement of the pedal in motor accelerating direction. In this position of the parts it will be understood that the clutch parts are out of driving engagement. It is thus impossible for the driver or operator to race the engine with the intention of letting the clutch in suddenly. It is first necessary for him to return the clutch parts to the full line position of Fig. 1 which engages the clutch and at the same time moves the abutment 14c out of the path of movement of the bar 12a, then only is it possible to move the accelerator in direction to speed up the motor. This compels the operator to use the clutch and the fluid drive in the manner intended. In other words, the clutch must be fully engaged before the motor can be speeded up and therefore the fluid drive will take hold of the load gradually, thus avoiding shocks as is intended in the usual operation of a fluid drive.

It is not necessary that all movement of accelerator 12 be prevented when the clutch is disengaged but it is desirable to hold the motor speed within that range where there is a very high percentage of slippage in the fluid coupling.

One of the advantages of my invention is that it is very simple and rugged and is at all times visible on top of the floor boards so that the driver can see what is going on and a quick inspection will disclose whether or not the interlock is in operative condition.

What I claim is:

Interrelating means between a motor accelerator and a clutch for connecting the motor to driven mechanism comprising an actuator for said accelerator, an actuator for said clutch, a bellcrank having one arm lying in the path of movement of said clutch actuator and having its other arm movable near the path of movement of said accelerator actuator, and an abutment on said other arm movable into accelerator actuator blocking position by movement of said clutch actuator in declutching direction.

STANLEY MAYNER.